US012779678B2

(12) United States Patent
Hatano

(10) Patent No.: US 12,779,678 B2
(45) Date of Patent: Nov. 3, 2026

(54) ROBOT DRIVE DEVICE, ROBOT DRIVE METHOD, NON-TRANSITORY STORAGE MEDIUM

(71) Applicant: TOYOTA JIDOSHA KABUSHIKI KAISHA, Toyota (JP)

(72) Inventor: Akira Hatano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 186 days.

(21) Appl. No.: 18/736,712

(22) Filed: Jun. 7, 2024

(65) Prior Publication Data

US 2025/0033198 A1 Jan. 30, 2025

(30) Foreign Application Priority Data

Jul. 24, 2023 (JP) ................................ 2023-120133

(51) Int. Cl.
*B25J 9/16* (2006.01)
*B25J 9/12* (2006.01)

(52) U.S. Cl.
CPC ................ *B25J 9/163* (2013.01); *B25J 9/12* (2013.01); *B25J 9/1653* (2013.01); *B25J 9/1664* (2013.01)

(58) Field of Classification Search
CPC ... B25J 9/12; B25J 9/163; B25J 9/1633; B25J 9/1641; B25J 9/1653; B25J 9/1664
See application file for complete search history.

(56) References Cited

U.S. PATENT DOCUMENTS 6,515,442 B1 * 2/2003 Okubo .................. G05B 19/19 318/632
2017/0153634 A1 * 6/2017 Koga .................. G05B 19/416

FOREIGN PATENT DOCUMENTS

JP 2022-099034 A 7/2022

* cited by examiner

*Primary Examiner* — Jerrod Irvin Davis
(74) *Attorney, Agent, or Firm* — Oliff PLC

(57) ABSTRACT

A device includes: a motor drive configured to increase and decrease a drive current according to a control instruction value and to output a position present value corresponding to a rotational angle of a motor, the drive current being provided to the motor attached to a joint of a robot; a control instruction value generation unit configured to generate the control instruction value; and a correction processing unit configured to output a corrected position target value and a corrected virtual spring constant to the control instruction value generation unit in cycles synchronized with cyclic processes of the control instruction value generation unit. The correction processing unit is configured to perform a correction process in which a position control method is applied to a low-frequency disturbance component, among disturbances provided to the motor, and in which a virtual spring constant control method is applied to a high-frequency disturbance component.

7 Claims, 6 Drawing Sheets

ROBOT DRIVE DEVICE, ROBOT DRIVE METHOD, NON-TRANSITORY STORAGE MEDIUM

CROSS-REFERENCE TO RELATED APPLICATION

This application claims priority to Japanese Patent Application No. 2023-120133 filed on Jul. 24, 2023, incorporated herein by reference in its entirety.

BACKGROUND

1. Technical Field

The present disclosure relates to a robot drive device, a robot drive method, and a non-temporary storage medium, and to a robot drive device, a robot drive method, and a non-temporary storage medium that control a robot using a virtual spring constant and a position target, for example.

2. Description of Related Art

A robot including an arm that contacts an object involves an issue that control becomes unstable since the amount of variation in input torque is large and the frequency of the variation is high when the arm contacts or collides with the object. Japanese Unexamined Patent Application Publication No. 2022-099034 (JP 2022-099034 A) discloses a technique of stabilizing such unstable control.

JP 2022-099034 A describes a robot including a body portion, a plurality of movement mechanism portions each including a movement mechanism that moves on a floor surface, and a plurality of leg portions each including one or more joint portions and connecting between the body portion and the movement mechanism portions, in which the joint portions include a drive shaft to be driven through impedance control.

SUMMARY

In the position control described in JP 2022-099034 A, however, it is necessary to set the virtual spring constant to be relatively high in order to ensure the precision of the position control, and vibration tends to occur as it is difficult to vary a target position if the precision in calculating the present position is low. In the spring constant control, meanwhile, there is a lower limit to a value that may be taken by the virtual spring constant, and the position deviation may not be allowed. In this manner, in the robot described in JP 2022-099034 A, there is a limit to the use of control parameters acquired to stabilize the position control and the torque control, and therefore it is difficult to sufficiently stabilize the position control and the torque control.

The present disclosure provides a robot drive device, a robot drive method, and a non-transitory storage medium that stabilize position control for a drive portion such as an arm of a robot better.

A first aspect of the present disclosure provides a robot drive device including: a motor drive circuit configured to increase and decrease a drive current according to a control instruction value and to output a position present value corresponding to a rotational angle of a motor, the drive current being provided to the motor attached to a joint of a robot; a control instruction value generation unit configured to generate the control instruction value using at least the position present value, a position target value for the joint of the robot, a virtual spring constant, a torque target value, and a speed target value; and a correction processing unit configured to output a corrected position target value and a corrected virtual spring constant to the control instruction value generation unit in cycles synchronized with cyclic processes of the control instruction value generation unit, the corrected position target value and the corrected virtual spring constant being obtained by correcting the position target value and the virtual spring constant, respectively. The correction processing unit is configured to perform a correction process in which a position control method is applied to a low-frequency disturbance component with a low frequency, among disturbances provided to the motor, and in which a virtual spring constant control method is applied to a high-frequency disturbance component with a high frequency, the position control method being a method in which the position target value is corrected, the virtual spring constant control method being a method in which the virtual spring constant is corrected.

A second aspect of the present disclosure provides a robot drive method for a robot drive device. The robot drive device includes a motor drive circuit configured to increase and decrease a drive current according to a control instruction value and to output a position present value corresponding to a rotational angle of a motor, the drive current being provided to the motor attached to a joint of a robot, a control instruction value generation unit configured to generate the control instruction value using at least the position present value, a position target value for the joint of the robot, a virtual spring constant, a torque target value, and a speed target value, and a correction processing unit configured to output a corrected position target value and a corrected virtual spring constant to the control instruction value generation unit in cycles synchronized with cyclic processes of the control instruction value generation unit, the corrected position target value and the corrected virtual spring constant being obtained by correcting the position target value and the virtual spring constant, respectively. The robot drive method includes performing a correction process in which a position control method is applied to a low-frequency disturbance component with a low frequency, among disturbances provided to the motor, and in which a virtual spring constant control method is applied to a high-frequency disturbance component with a high frequency, by using the correction processing unit, the position control method being a method in which the position target value is corrected, the virtual spring constant control method being a method in which the virtual spring constant is corrected.

A third aspect of the present disclosure provides a non-transitory storage medium storing instructions that are executable by one or more processors of a robot drive device and that cause the one or more processors to perform a function. The robot drive device includes a motor drive circuit configured to increase and decrease a drive current according to a control instruction value, and to output a position present value corresponding to a rotational angle of a motor, the drive current being provided to the motor attached to a joint of a robot, a control instruction value generation unit configured to generate the control instruction value using at least the position present value, a position target value for the joint of the robot, a virtual spring constant, a torque target value, and a speed target value, a correction processing unit configured to output a corrected position target value and a corrected virtual spring constant to the control instruction value generation unit in cycles synchronized with cyclic processes of the control instruction value generation unit, the corrected position target value and the corrected virtual spring constant being obtained by correcting the position target value and the virtual spring constant, respectively, and the one or more processors configured to perform a computation process of the correction processing unit. The functions includes performing a correction process in which a position control method is applied to a low-frequency disturbance component with a low frequency, among disturbances provided to the motor, and in which a virtual spring constant control method is applied to a high-frequency disturbance component with a high frequency, the position control method being a method in which the position target value is corrected, the virtual spring constant control method being a method in which the virtual spring constant is corrected.

With the robot drive device, the robot drive method, and the non-transitory storage medium according to the present disclosure, a position target value is corrected when the frequency of disturbances provided to a motor is low, and a virtual spring constant is corrected when the frequency of such disturbances is high.

According to the present disclosure, it is possible to enhance the stability of position control for a robot.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
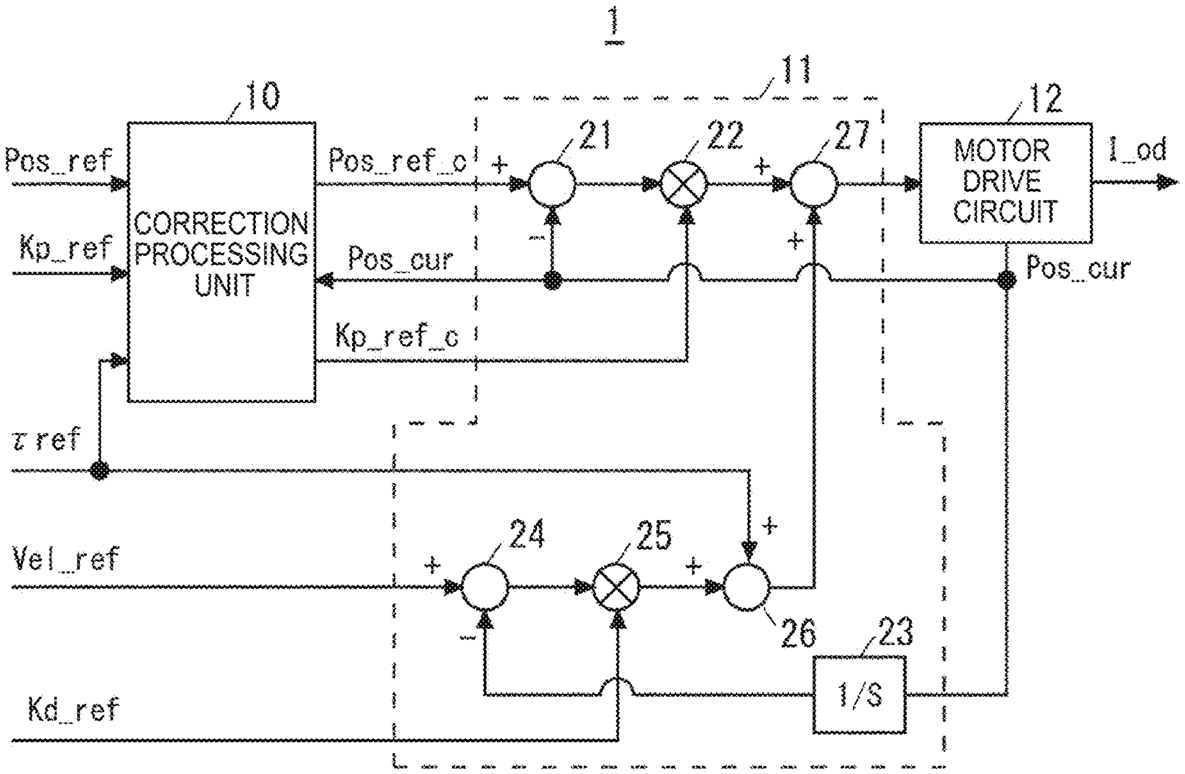
FIG. 1 is a block diagram of a robot drive device according to a first embodiment.

In the robot drive device according to the first aspect of the present disclosure, the correction processing unit may be configured to perform a referencing process of referencing a disturbance index target value which is set in advance and is a target value for a disturbance index fluctuated by the disturbances provided to the motor, a first correction process in which the corrected position target value is set to a value calculated based on a first calculation formula set in advance if the low-frequency disturbance component having frequency characteristic on a low frequency side, among components of the disturbance index, is equal to or more than the disturbance index target value, and in which the corrected position target value is set to a first initial value set in advance if the low-frequency disturbance component is less than the disturbance index target value, and a second correction process in which the corrected virtual spring constant is set to a value calculated based on a second calculation formula set in advance if the high-frequency disturbance component having frequency characteristic on a high frequency side, among the components of the disturbance index, is equal to or more than the disturbance index target value, and in which the corrected virtual spring constant is set to a second initial value set in advance if the high-frequency disturbance component is less than the disturbance index target value.

In the robot drive device according to the first aspect of the present disclosure, the correction processing unit may be configured to perform the second correction process with reference to the corrected position target value set in the first correction process.

In the robot drive device according to the first aspect of the present disclosure, the correction processing unit may be configured to perform a first supplementary correction process in which the corrected virtual spring constant is set to a third initial value set in advance, in addition to the first correction process, when the low-frequency disturbance component is equal to or more than the high-frequency disturbance component, and a second supplementary correction process in which the corrected position target value is set to a fourth initial value set in advance, in addition to the second correction process, when the low-frequency disturbance component is less than the high-frequency disturbance component.

In the robot drive device according to the first aspect of the present disclosure, the disturbance index may be a position deviation of the joint or a torque deviation of the motor; and the correction processing unit may include a filtering unit configured to divide the position deviation of the joint or the torque deviation of the motor into a high frequency side component and a low frequency side component.

In order to clarify the explanation, the following description and drawings have been omitted or simplified as appropriate. Elements illustrated in the drawings as functional blocks that perform various processes can be constituted by a central processing unit (CPU), a memory, and other circuits in terms of hardware, and can be implemented by a program etc. loaded into a memory in terms of software. Thus, a person skilled in the art will understand that these functional blocks can be implemented in various forms by hardware alone, software alone, or a combination thereof, and that the functional blocks are not limited to any of such forms. In the drawings, like elements are given like reference signs, and redundant description is omitted as necessary.

The program discussed above includes a group of instructions (or software codes) for causing a computer to perform one or more of the functions described in relation to the embodiments when loaded into the computer. The program may be stored in a non-transitory computer-readable medium or a tangible storage medium. Examples of the computer-readable medium or the tangible storage medium include, but are not limited to, a random-access memory (RAM), a read-only memory (ROM), a flash memory, a solid-state drive (SSD), and other memory technologies, a compact disc read-only memory (CD-ROM), a digital versatile disc (DVD), a Blu-ray (registered trademark) disc, and other optical disc storages, and a magnetic cassette, a magnetic tape, a magnetic disk storage, and other magnetic storage devices. The program may be transmitted on a transitory computer-readable medium or a communication medium. Examples of the transitory computer-readable medium or the communication medium include, but are not limited to, propagating signals in electrical, optical, acoustic, or other forms.

First Embodiment

FIG. 1 is a block diagram of a robot drive device 1 according to a first embodiment. In the example illustrated in FIG. 1, a robot is driven by driving a motor provided at a joint etc. of an arm of the robot. As illustrated in FIG. 1, the robot drive device 1 according to the first embodiment includes a correction processing unit 10, a control instruction value generation unit 11, and a motor drive circuit 12. The robot drive device 1 is provided with a position target value Pos_ref, a virtual spring constant Kp_ref, a torque target value τref, a speed target value Vel_ref, and a control gain Kd_ref from a higher-level system (not illustrated). The robot drive device 1 may not be provided with the control gain Kd_ref.

The motor drive circuit 12 increases and decreases a drive current I_od, to be provided to a motor attached to a joint of the robot, according to a control instruction value, and outputs a position present value Pos_cur corresponding to the rotational angle of the motor. The control instruction value generation unit 11 generates the control instruction value using at least the position present value Pos_cur, the position target value Pos_ref for the joint of the robot, the virtual spring constant Kp_ref, the torque target value τref, and the speed target value Vel_ref. The correction processing unit 10 outputs a corrected position target value Pos_ref_c and a corrected virtual spring constant Kp_ref_c, obtained by correcting the position target value Pos_ref and the virtual spring constant Kp_ref, respectively, in cycles synchronized with cyclic processes of the control instruction value generation unit 11. In the first embodiment, the control instruction value generation unit 11 uses the corrected position target value Pos_ref_c and the corrected virtual spring constant Kp_ref_c, output from the correction processing unit 10, as the position target value Pos_ref and the virtual spring constant Kp_ref.

FIG. 1 illustrates an example of the configuration of the control instruction value generation unit 11. Specifically, in the example illustrated FIG. 1, the control instruction value generation unit 11 includes a subtractor 21, a multiplier 22, a present speed calculation unit 23, a subtractor 24, a multiplier 25, an adder 26, and an adder 27.

The subtractor 21 subtracts the position present value Pos_cur from the corrected position target value Pos_ref_c and outputs a position deviation. The multiplier 22 outputs a value obtained by multiplying the position deviation, output from the subtractor 21, by the corrected virtual spring constant Kp_ref_c. The present speed calculation unit 23 differentiates the position present value Pos_cur and outputs a speed present value. The subtractor 24 subtracts the speed present value from the speed target value Vel_ref and outputs a speed deviation. The multiplier 25 outputs a value obtained by multiplying the speed deviation, output from the subtractor 24, by the control gain Kd_ref. The adder 26 outputs a value obtained by adding the torque target value τref to the value output from the multiplier 25. The adder 27 adds the value output from the adder 26 to the value output from the multiplier 22 and outputs the control instruction value to be provided to the motor drive circuit 12.

In the robot drive device 1 according to the first embodiment, the correction processing unit 10 performs a correction process in which a position control method, in which the position target value Pos_ref is corrected, is applied to a low-frequency disturbance component with a low frequency, among disturbances provided to the motor, and a virtual spring constant control method, in which the virtual spring constant Kp_ref is corrected, is applied to a high-frequency disturbance component with a high frequency. Specifically, the correction processing unit 10 makes a correction corresponding to the factors of disturbances applied to the motor for at least one of the position target value Pos_ref and the virtual spring constant Kp_ref. While the correction process is switched using a parameter that instructs torque, among parameters fluctuated because of disturbances applied to the motor, in the example to be described below, it is possible to switch the correction process using any parameter that includes components with different frequencies, among parameters that can grasp variations caused in the motor due to the disturbances.

In the robot drive device 1 according to the first embodiment, further specifically, the frequency characteristics of torque fluctuations are analyzed, and a first correction process in which a position control method is used to correct a position target value is performed for torque fluctuations on the low frequency side, and a second correction process in which a virtual spring constant control method is used to correct a virtual spring constant is performed for torque fluctuations on the high frequency side. Thus, control logics for the position control method and the virtual spring constant control method will be described.

Figure 2:
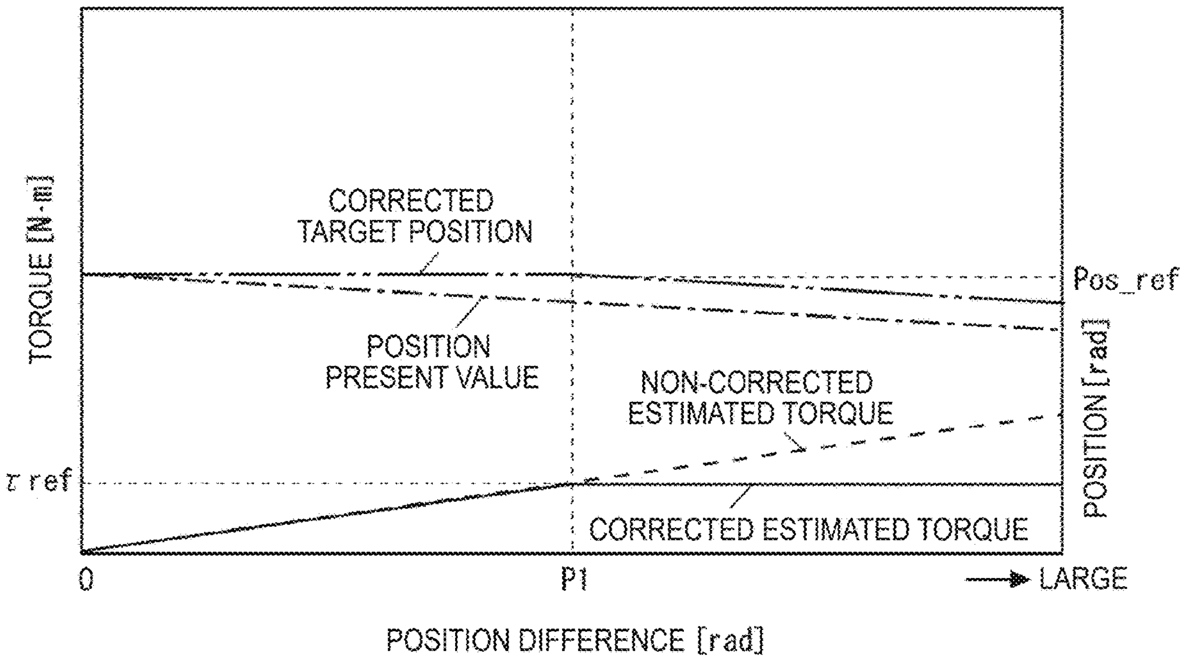
FIG. 2 illustrates a control logic for a case where a position target value is varied.

FIG. 2 illustrates a control logic for a case where the position target value is varied (position control method). In FIG. 2, it is assumed that the virtual spring constant is kept constant. In the example illustrated in FIG. 2, estimated torque τcur reaches the torque target value τref when the difference between the position present value and the position target value Pos_ref, as a target value for the position, reaches a position difference P1. With the position control method, the position target value Pos_ref is corrected to the corrected position target value Pos_ref_c (corrected target position in FIG. 2) such that the difference between the position present value and the position target value Pos_ref is kept constant when the difference between the position present value and the position target value Pos_ref is further increased. When the position control method is not applied, the estimated torque becomes greater than the torque target value τref (non-corrected torque in FIG. 2) in order to bring the position present value closer to the position target value Pos_ref when the position difference between the present position value and the position target value Pos_ref is increased to be more than the position difference P1. When the position control method is applied, on the other hand, the corrected estimated torque is maintained at the torque target value τref even if the position difference between the position present value and the position target value Pos_ref is increased to be more than the position difference P1.

Figure 3:
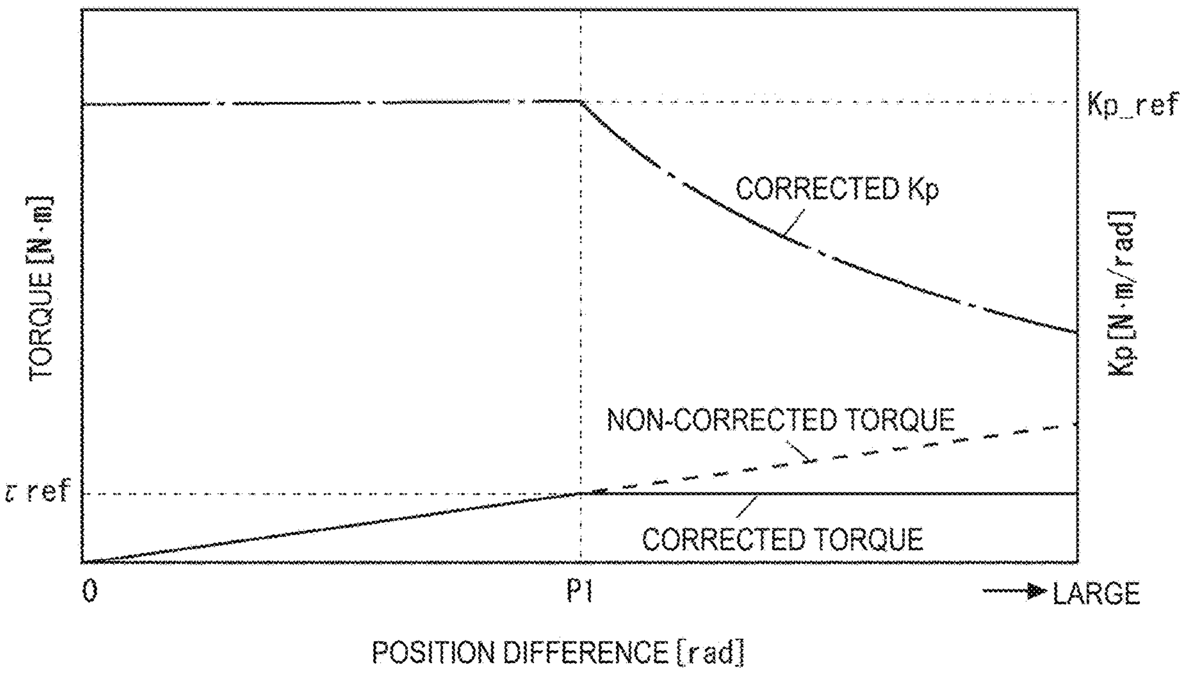
FIG. 3 illustrates a control logic for a case where a virtual spring constant is varied.

Subsequently, FIG. 3 illustrates a control logic for a case where the virtual spring constant is varied (virtual spring constant control method). In the example illustrated in FIG. 3, it is assumed that the position target value is kept constant. Also in the example illustrated in FIG. 3, the estimated torque tour reaches the torque target value τref when the difference between the position present value and the position target value Pos_ref, as a target value for the position, reaches the position difference P1. With the virtual spring constant method, the virtual spring constant Kp is corrected so as to become gradually smaller than the virtual spring constant Kp_ref according to the magnitude of the position difference when the difference between the position present value and the position target value Pos_ref is further increased. When the virtual spring constant control method is not applied, the estimated torque becomes greater than the torque target value τref (non-corrected torque in FIG. 3) in order to bring the position present value closer to the position target value Pos_ref when the position difference between the present position value and the position target value Pos_ref is increased to be more than the position difference P1. When the virtual spring constant control method is applied, on the other hand, the corrected estimated torque is maintained at the torque target value τref even if the position difference between the position present value and the position target value Pos_ref is increased to be more than the position difference P1.

As described with reference to FIGS. 2 and 3, the estimated torque can be limited up to the torque target value τref using either of the position control method and the virtual spring constant control method. However, there is a difference between the two control methods: the position control method is more effective in controlling torque fluctuated at low frequencies, and the virtual spring constant control method is more effective in controlling torque fluctuated at high frequencies. Thus, in the robot drive device 1 according to the first embodiment, the correction processing unit 10 performs a first correction process in which the position control method is used to correct a position target value for torque fluctuations on the low frequency side, and performs a second correction process in which the virtual spring constant control method is used to correct a virtual spring constant for torque fluctuations on the high frequency side. Thus, the configuration and operation of the correction processing unit 10 will be described in further details below.

To perform the correction process, the correction processing unit 10 performs a referencing process, a first correction process, and a second correction process. In the referencing process, reference is made to a disturbance index target value set in advance as a target value for a disturbance index fluctuated by disturbances provided to the motor. In the following description, a torque value is used as the disturbance index, and thus the correction processing unit 10 references the torque target value τref as a target value for the disturbance index. In addition, the correction processing unit 10 uses, as torque of the motor, an estimated value obtained from computation performed using a position present value obtained from the motor. This estimated value of torque will be referred to as estimated torque in the following description. While the correction processing unit 10 to be described below calculates estimated torque using the position present value Pos_cur output based on the rotational angle acquired by the motor drive circuit 12 through motor control, it is also possible to use a value obtained from a parameter acquired using a torque sensor, a current sensor, etc. as the estimated torque to be described below. The torque sensor has a low response frequency (e.g., 1 kHz or less), and therefore torque values obtained from the torque sensor are suitable as substitute values for low-frequency estimated torque τcur_L to be described below. Meanwhile, the current sensor has a high response frequency (e.g., 200 kHz or less), and therefore estimated torque calculated from current values obtained from the current sensor are suitable as substitute values for high-frequency estimated torque τcur_H to be described below.

In the first correction process, the corrected position target value Pos_ref_c is set to a value calculated based on a first calculation formula set in advance if a low-frequency disturbance component (e.g. low-frequency estimated torque τcur_L) having frequency characteristics on the low frequency side, among components of the disturbance index (estimated torque), is equal to or more than the disturbance index target value (e.g. the torque target value τref), and the corrected position target value Pos_ref_c is set to a first initial value (e.g. the position target value Pos_ref) set in advance if the low-frequency disturbance component is not equal to or more than the disturbance index target value.

In the second correction process, the corrected virtual spring constant Kp_ref_c is set to a value calculated based on a second calculation formula set in advance if a high-frequency disturbance component (e.g. high-frequency estimated torque τcur_H) having frequency characteristics on the high frequency side, among the components of the disturbance index (estimated torque), is equal to or more than the disturbance index target value (e.g. the torque target value τref), and the corrected virtual spring constant Kp_ref_c is set to a second initial value set in advance if the high-frequency disturbance component is not equal to or more than the disturbance index target value.

Figure 4:
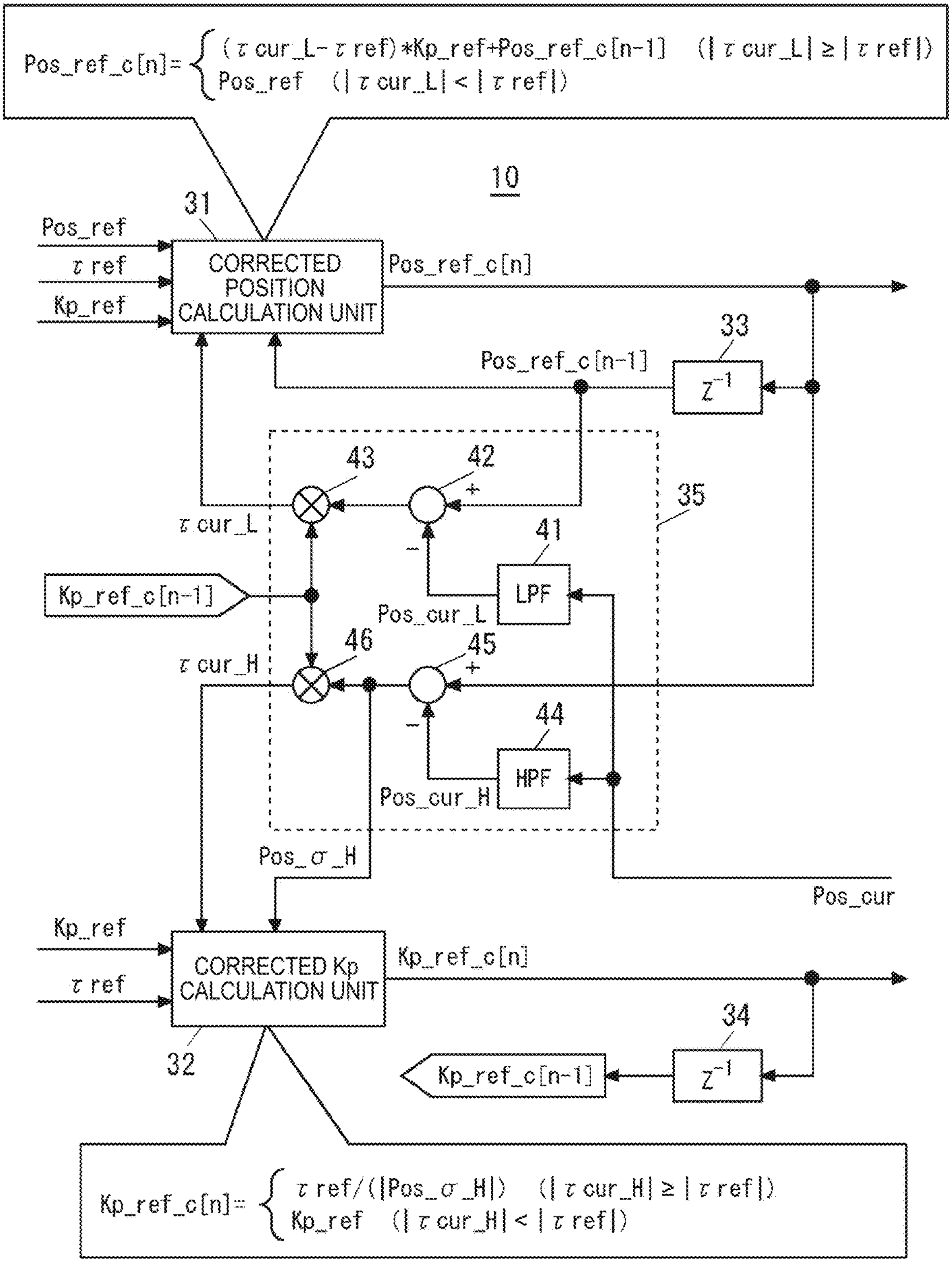
FIG. 4 is a block diagram of a correction processing unit according to the first embodiment.

An example of the configuration of the correction processing unit 10 that implements the above operation will be described. FIG. 4 is a block diagram of the correction processing unit 10 according to the first embodiment. As illustrated in FIG. 4, the correction processing unit 10 includes a corrected position calculation unit 31, a corrected Kp calculation unit 32, delay circuits 33, 34, and a filtering unit 35. In the robot drive device 1 according to the first embodiment, the control instruction value generation unit 11 generates a control instruction value to be provided to the motor drive circuit 12 in predetermined cycles, and therefore the correction processing unit 10 also performs a correction process in cycles synchronized with the cycles of the control instruction value generation unit 11. In FIG. 4 and the following description, symbol n indicates the present cycle, and symbol n−1 indicates the preceding cycle.

The corrected position calculation unit 31 performs the referencing process and the first correction process. Specifically, in the referencing process, the corrected position calculation unit 31 references the torque target value τref that has been provided. In addition, the corrected position calculation unit 31 compares the torque target value τref and the low-frequency estimated torque τcur_L calculated by the filtering unit 35, and calculates the corrected position target value Pos_ref_c, as a corrected value of the position target value Pos_ref, based on the formula (1) when the low-frequency estimated torque τcur_L is equal to or more than the torque target value τref. The formula (1) can be regarded as an example of the first calculation formula.

$$\text{Pos\_ref\_c}[n] = (\tau\text{cur\_L} - \tau ref) * \text{Kp\_ref} * \text{Pos\_ref\_c}[n-1] \tag{1}$$

In the formula (1), Kp_ref is the virtual spring constant Kp_ref. When the low-frequency estimated torque τcur_L is not equal to or more than the torque target value τref, on the other hand, the corrected position calculation unit 31 calculates the corrected position target value Pos_ref_c, as a corrected value of the position target value Pos_ref, based on the formula (2).

$$\text{Pos\_ref\_c}[n] = \text{Pos\_ref} \tag{2}$$

That is, the corrected position calculation unit 31 returns the corrected position target value Pos_ref_c to the position target value Pos_ref, or maintains the corrected position target value Pos_ref_c, when the low-frequency estimated torque τcur_L is not equal to or more than the torque target value τref. The position target value Pos_ref can be regarded as an example of the first initial value.

The corrected Kp calculation unit 32 performs the referencing process and the second correction process. Specifically, in the referencing process, the corrected Kp calculation unit 32 references the torque target value τref that has been provided. In addition, the corrected Kp calculation unit 32 compares the torque target value τref and the high-frequency estimated torque τcur_H calculated by the filtering unit 35, and calculates the corrected virtual spring constant Kp_ref_c, as a corrected value of the virtual spring constant Kp_ref, based on the formula (3) when the high-frequency estimated torque τcur_H is equal to or more than the torque target value τref. The formula (3) can be regarded as an example of the second calculation formula.

$$\text{Kp\_ref}[n] = \tau ref/(\text{Pos\_}\sigma\text{\_H}) \quad (3)$$

Pos_σ_H in the formula (3) is a position deviation on the high-frequency side, and is represented by the formula (4).

$$\text{Pos\_}\sigma\text{\_H} = \text{Pos\_ref\_c}[n] - \text{Pos\_cur\_L} \quad (4)$$

In the formula (4), Pos_cur_L is the high-frequency position present value Pos_cur_H. When the high-frequency estimated torque τcur_H is not equal to or more than the torque target value τref, on the other hand, the corrected Kp calculation unit 32 calculates the corrected virtual spring constant Kp_ref_c, as a corrected value of the virtual spring constant Kp_ref, based on the formula (5).

$$\text{Kp\_ref\_c}[n] = \text{Kp\_ref} \quad (5)$$

That is, the corrected Kp calculation unit 32 returns the corrected virtual spring constant Kp_ref_c to the virtual spring constant Kp_ref, or maintains the corrected virtual spring constant Kp_ref_c, when the high-frequency estimated torque τcur_H is not equal to or more than the torque target value τref. The virtual spring constant Kp_ref can be regarded as an example of the second initial value.

The delay circuit 33 holds the corrected position target value Pos_ref_c output from the corrected position calculation unit 31 until the next processing cycle. The delay circuit 34 holds the corrected virtual spring constant Kp_ref_c output from the corrected Kp calculation unit 32 until the next processing cycle.

The filtering unit 35 divides the position deviation of the joint or the torque deviation of the motor into high-frequency side components and low-frequency side components. Specifically, the filtering unit 35 calculates a low-frequency position present value Pos_cur_L and a high-frequency position present value Pos_cur_H by acquiring the position present value Pos_cur from the motor and performing a filtering process on the acquired position present value Pos_cur. Then, the filtering unit 35 calculates a low-frequency position deviation and the low-frequency estimated torque τcur_L using the low-frequency position present value Pos_cur_L. In addition, the filtering unit 35 calculates a high-frequency position deviation Pos_σ_H and the high-frequency estimated torque τcur_H using the high-frequency position present value Pos_cur_H.

In order to perform the above computation, the filtering unit 35 includes a low-pass filter 41, a subtractor 42, a multiplier 43, a high-pass filter 44, a subtractor 45, and a multiplier 46. The low-pass filter 41 performs a low-pass filtering process on the position present value Pos_cur and outputs the low-frequency position present value Pos_cur_L. The subtractor 42 subtracts the low-frequency position present value Pos_cur_L from a corrected position target preceding value Pos_ref_c[n−1] and outputs the low-frequency position deviation. The multiplier 43 multiplies the corrected virtual spring constant preceding value Kp_ref_c[n−1] by the low-frequency position deviation output from the subtractor 42 and outputs the low-frequency estimated torque τcur_L.

The high-pass filter 44 performs a high-pass filtering process on the position present value Pos_cur and outputs the high-frequency position present value Pos_cur_H. The subtractor 45 subtracts the high-frequency position present value Pos_cur_H from a corrected position target value Pos_ref_c[n] and outputs the high-frequency position deviation Pos_σ_H. The multiplier 46 multiplies the corrected virtual spring constant preceding value Kp_ref_c[n−1] by the high-frequency position deviation Pos_σ_H output from the subtractor 45 and outputs the high-frequency estimated torque τcur_H.

Figure 5:
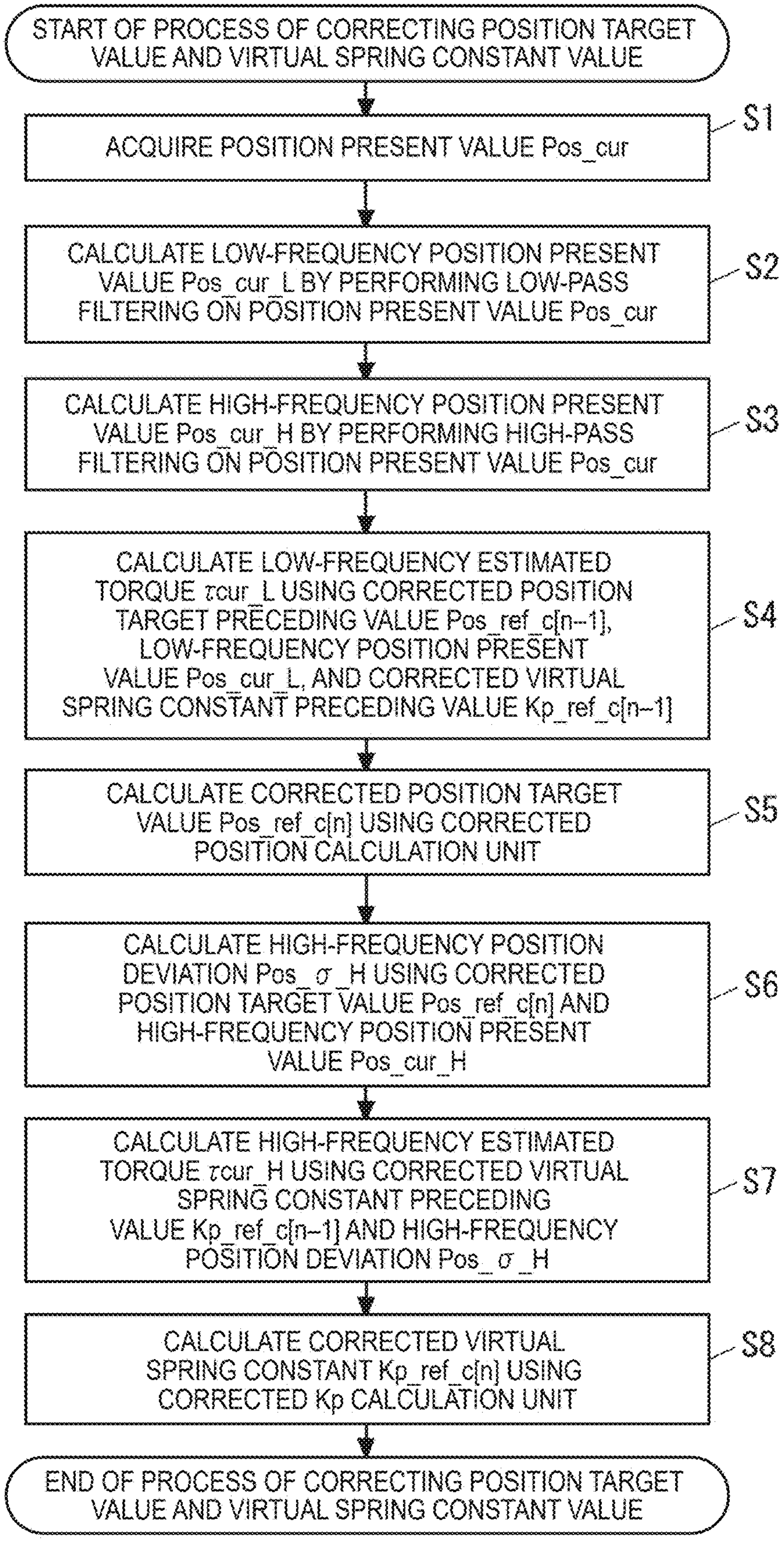
FIG. 5 is a flowchart illustrating operation of the correction processing unit according to the first embodiment.

The order in which the above processes are performed will be specifically described. FIG. 5 is a flowchart illustrating operation of the correction processing unit 10 according to the first embodiment. The correction processing unit 10 repeatedly performs the process illustrated in FIG. 5 in cycles synchronized with the processing cycle of the control instruction value generation unit 11.

As illustrated in FIG. 5, when the process is started, first, the correction processing unit 10 acquires a position present value Pos_cur (step S1). Subsequently, the low-pass filter 41 of the correction processing unit 10 calculates a low-frequency position present value Pos_cur_L from the position present value Pos_cur (step S2). In addition, the high-pass filter 44 of the correction processing unit 10 calculates a high-frequency position present value Pos_cur_H from the position present value Pos_cur (step S3).

Then, the filtering unit 35 of the correction processing unit 10 calculates low-frequency estimated torque τcur_L using the corrected position target preceding value Pos_ref_c[n−1], the low-frequency position present value Pos_cur_L, and the corrected virtual spring constant preceding value Kp_ref_c[n−1] (step S4). After that, the corrected position calculation unit 31 of the correction processing unit 10 calculates a corrected position target value Pos_ref_c[n] (step S5). In step S5, the corrected position calculation unit 31 selects one of the calculation formulas (1) and (2) based on the magnitude relationship between the low-frequency estimated torque τcur_L and the torque target value τref and calculates a corrected position target value Pos_ref_c[n].

Then, the filtering unit 35 of the correction processing unit 10 calculates a high-frequency position deviation Pos_σ_H using the corrected position target value Pos_ref_c[n] calculated in step S5 and the high-frequency position present value Pos_cur_H (step S6). In addition, the filtering unit 35 of the correction processing unit 10 calculates high-frequency estimated torque τcur_H using the corrected virtual spring constant preceding value Kp_ref_c[n−1] and the high-frequency position deviation Pos_σ_H (step S7). After that, the corrected Kp calculation unit 32 of the correction processing unit 10 calculates a corrected virtual spring constant Kp_ref_c[n] (step S8). In step S8, the corrected Kp calculation unit 32 selects one of the calculation formulas (3) and (5) based on the magnitude relationship between the high-frequency estimated torque τcur_H and the torque target value τref and calculates a corrected virtual spring constant Kp_ref_c[n].

In the robot drive device 1 according to the first embodiment, as described above, the correction processing unit 10 performs control in which torque fluctuations caused by disturbances are divided into low-frequency components and high-frequency components, the position control method is applied to the low-frequency components, and the virtual spring constant control method is applied to the high-frequency components. This enables the robot drive device 1 according to the first embodiment to be free from the limit imposed by the control method in which only one of the position control method and the virtual spring constant control method is applied. Then, it is possible for the robot drive device 1 according to the first embodiment to achieve high stability compared to the control method in which only one of the position control method and the virtual spring constant control method is applied.

Specifically, the robot drive device 1 according to the first embodiment can stably control the position and torque when an arm etc. driven by a motor collides with or contacts an object. In addition, the robot drive device 1 according to the first embodiment can keep torque constant when the position deviation becomes further greater after an arm etc. driven by a motor collides with or contacts an object. Such control enables the robot drive device 1 according to the first embodiment to reduce accidents in which an object is damaged when an arm collides with or contacts the object.

Second Embodiment

In a second embodiment, a correction processing unit 10*a* as a different form of the correction processing unit 10 according to the first embodiment will be described. In the description of the second embodiment, constituent elements described in relation to the first embodiment are given like reference signs to omit description.

Figure 6:
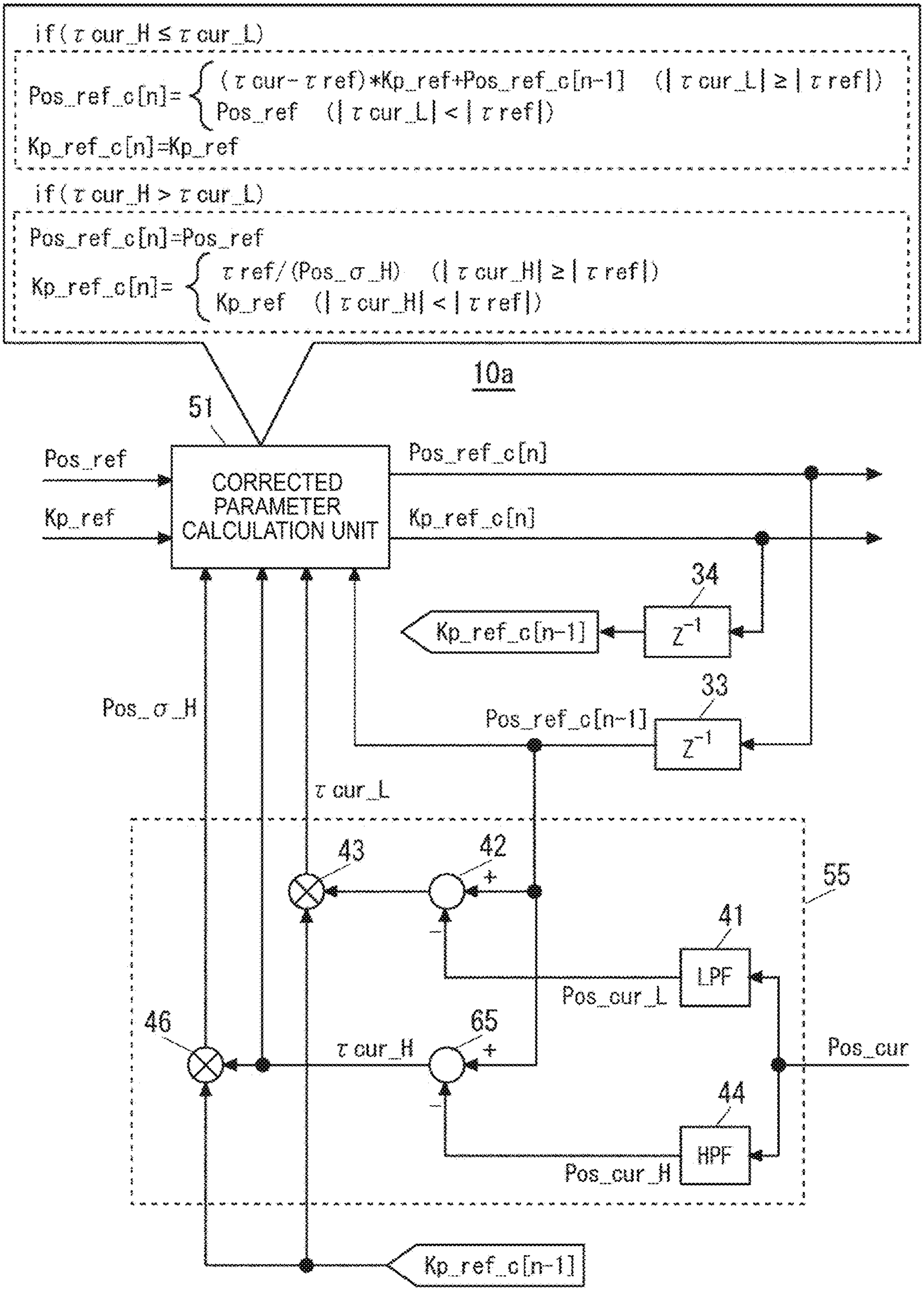
FIG. 6 is a block diagram of a correction processing unit according to a second embodiment.

FIG. 6 is a block diagram of the correction processing unit 10*a* according to the second embodiment. In the correction processing unit 10*a* according to the second embodiment, as illustrated in FIG. 6, the corrected position calculation unit 31, the corrected Kp calculation unit 32, and the filtering unit 35 are replaced with a corrected parameter calculation unit 51 and a filtering unit 55. The corrected parameter calculation unit 51 performs the first correction process performed by the corrected position calculation unit 31 and the second correction process performed by the corrected Kp calculation unit 32.

Here, the corrected parameter calculation unit 51 performs the first correction process in which a corrected position target value Pos_ref_c[n] is calculated based on the formulas (1) and (2) when the low-frequency estimated torque τcur_L is equal to or more than the high-frequency estimated torque τcur_H. In addition, the corrected parameter calculation unit 51 sets the corrected virtual spring constant Kp_ref_c[n] to an initial value (e.g., the virtual spring constant Kp_ref) set in advance, along with the first correction process.

Meanwhile, the corrected parameter calculation unit 51 performs the second correction process in which a corrected virtual spring constant Kp_ref_c[n] is calculated based on the formulas (3) and (5) when the low-frequency estimated torque τcur_L is not equal to or more than the high-frequency estimated torque τcur_H. In addition, the corrected parameter calculation unit 51 sets the corrected position target value Pos_ref_c[n] to an initial value (e.g., the position target value Pos_ref) set in advance, along with the second correction process.

The filtering unit 55 is obtained by replacing the subtractor 45 with a subtractor 65. The filtering unit 55 calculates a high-frequency position deviation Pos_σ_H by the subtractor 65 subtracting the high-frequency position present value Pos_cur_H from the corrected position target preceding value Pos_ref_c[n−1]. In the second embodiment, the corrected parameter calculation unit 51 can perform a correction process on one of the position target value Pos_ref and the virtual spring constant Kp_ref based on the magnitude relationship between the high-frequency estimated torque τcur_H and the low-frequency estimated torque τcur_L by using the corrected position target preceding value Pos_ref_c[n−1], calculated in the preceding cycle, in calculating a corrected value of the virtual spring constant Kp_ref.

As has been described above, operation of the correction processing unit 10*a* according to the second embodiment is different in the process flow for calculating corrected values. Thus, operation of the correction processing unit 10*a* according to the second embodiment will be described with reference to the flowchart in FIG. 7 illustrating operation of the correction processing unit 10*a*.

Figure 7:
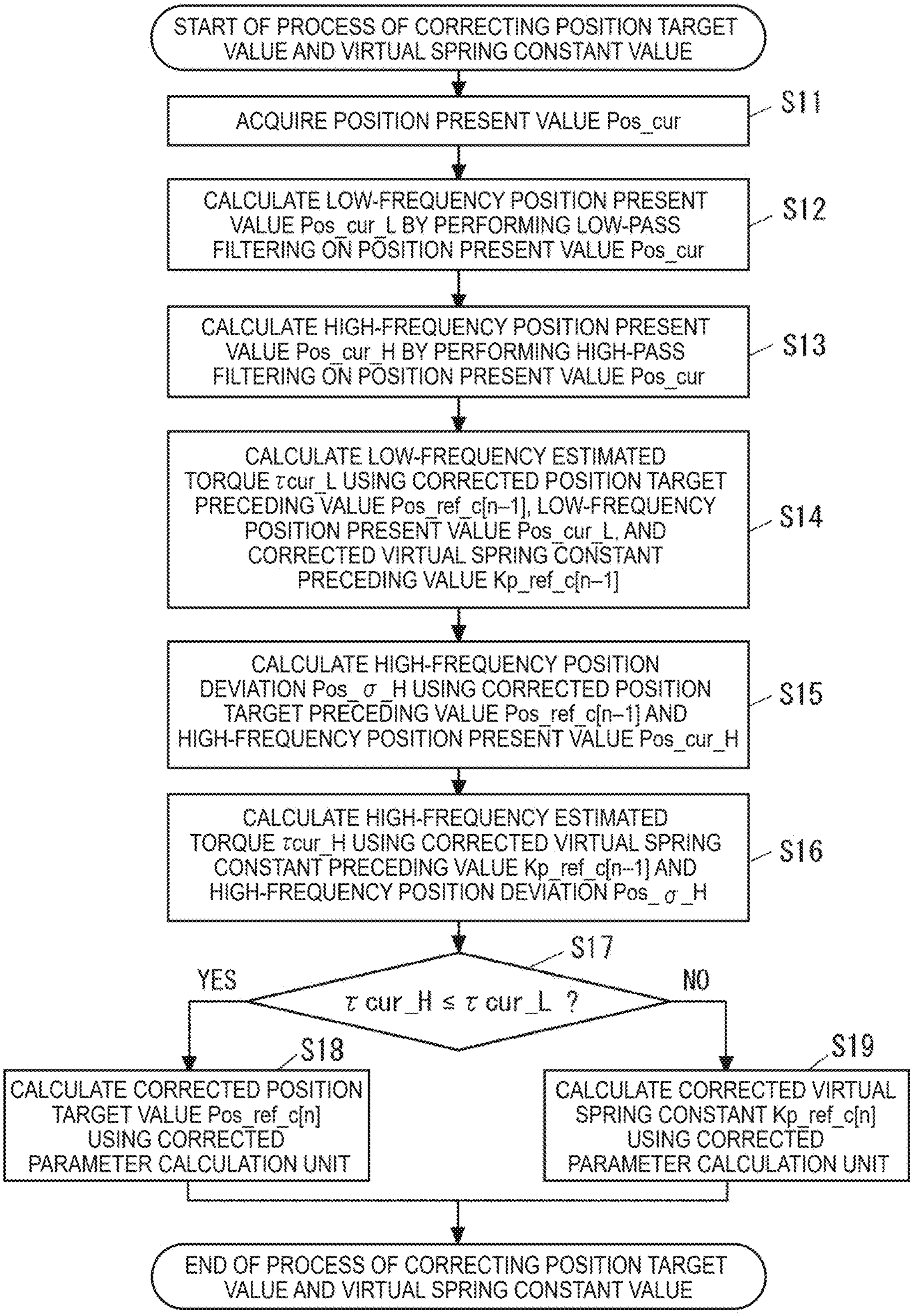
FIG. 7 is a flowchart illustrating operation of the correction processing unit according to the second embodiment.

As illustrated in FIG. 7, when the process is started, first, the correction processing unit 10*a* acquires a position present value Pos_cur (step S11). Subsequently, the low-pass filter 41 of the correction processing unit 10*a* calculates a low-frequency position present value Pos_cur_L from the position present value Pos_cur (step S12). In addition, the high-pass filter 44 of the correction processing unit 10*a* calculates a high-frequency position present value Pos_cur_H from the position present value Pos_cur (step S13).

Then, the filtering unit 55 of the correction processing unit 10*a* calculates low-frequency estimated torque τcur_L using the corrected position target preceding value Pos_ref_c[n−1], the low-frequency position present value Pos_cur_L, and the corrected virtual spring constant preceding value Kp_ref_c[n−1] (step S14). In addition, the filtering unit 55 of the correction processing unit 10*a* calculates a high-frequency position deviation Pos_σ_H using the corrected position target preceding value Pos_ref_c[n−1] and the high-frequency position present value Pos_cur_H (step S15). Then, the filtering unit 55 of the correction processing unit 10*a* calculates high-frequency estimated torque τcur_H using the corrected virtual spring constant preceding value Kp_ref_c[n−1] and the high-frequency position deviation Pos_σ_H (step S16).

After that, the corrected parameter calculation unit 51 of the correction processing unit 10*a* compares the magnitudes of the low-frequency estimated torque τcur_L and the high-frequency estimated torque τcur_H (step S17). Then, a corrected position target value Pos_ref_c[n] is calculated through the first correction process if the low-frequency estimated torque τcur_L is equal to or more than the high-frequency estimated torque τcur_H (step S18). In step S18, in addition, the correction processing unit 10*a* outputs the virtual spring constant Kp_ref (that can be regarded as an example of a third initial value) as the corrected virtual spring constant Kp_ref_c[n] through a first supplementary correction process, although not illustrated. On the other hand, a corrected virtual spring constant Kp_ref_c[n] is calculated through a second correction process if the low-frequency estimated torque τcur_L is not equal to or more than the high-frequency estimated torque τcur_H (step S19). In step S19, in addition, the correction processing unit 10*a* outputs the position target value Pos_ref (that can be regarded as an example of a fourth initial value) as the corrected position target value Pos_ref_c[n] through a second supplementary correction process, although not illustrated.

As described above, with the robot drive device including the correction processing unit 10*a* according to the second embodiment, the amount of calculation required to calculate the corrected position target value Pos_ref_c and the corrected virtual spring constant Kp_ref_c is less than that with the correction processing unit 10 according to the first embodiment. This allows the correction processing unit 10*a* according to the second embodiment to reduce the computation load compared to the correction processing unit 10 according to the first embodiment. In addition, since the computation load is reduced compared to the correction processing unit 10 according to the first embodiment, the correction processing unit 10*a* according to the second embodiment can operate in shorter cycles.

While the present disclosure has been specifically described above based on the embodiments, the present disclosure is not limited to the above embodiments, and various modifications can be made without departing from the spirit and scope of the present disclosure.

What is claimed is:

1. A robot drive device comprising:

a motor drive circuit configured to increase and decrease a drive current according to a control instruction value and to output a position present value corresponding to a rotational angle of a motor, the drive current being provided to the motor attached to a joint of a robot;

a first processor configured to generate the control instruction value using at least the position present value, a position target value for the joint of the robot, a virtual spring constant, a torque target value, and a speed target value; and a second processor configured to output a corrected position target value and a corrected virtual spring constant to the first processor in cycles synchronized with cyclic processes of the first processor, the corrected position target value and the corrected virtual spring constant being obtained by correcting the position target value and the virtual spring constant, respectively, wherein the second processor is configured to perform a correction process in which a position control method is applied to a low-frequency disturbance component with a low frequency, among disturbances provided to the motor, and in which a virtual spring constant control method is applied to a high-frequency disturbance component with a high frequency, the position control method being a method in which the position target value is corrected, the virtual spring constant control method being a method in which the virtual spring constant is corrected.

2. The robot drive device according to claim 1, wherein the second processor is configured to perform a referencing process of referencing a disturbance index target value which is set in advance and is a target value for a disturbance index fluctuated by the disturbances provided to the motor, a first correction process in which the corrected position target value is set to a value calculated based on a first calculation formula set in advance if the low-frequency disturbance component having frequency characteristic on a low frequency side, among components of the disturbance index, is equal to or more than the disturbance index target value, and in which the corrected position target value is set to a first initial value set in advance if the low-frequency disturbance component is less than the disturbance index target value, and a second correction process in which the corrected virtual spring constant is set to a value calculated based on a second calculation formula set in advance if the high-frequency disturbance component having frequency characteristic on a high frequency side, among the components of the disturbance index, is equal to or more than the disturbance index target value, and in which the corrected virtual spring constant is set to a second initial value set in advance if the high-frequency disturbance component is less than the disturbance index target value.

3. The robot drive device according to claim 2, wherein the second processor is configured to perform the second correction process with reference to the corrected position target value set in the first correction process.

4. The robot drive device according to claim 2, wherein the second processor is configured to perform a first supplementary correction process in which the corrected virtual spring constant is set to a third initial value set in advance, in addition to the first correction process, when the low-frequency disturbance component is equal to or more than the high-frequency disturbance component, and a second supplementary correction process in which the corrected position target value is set to a fourth initial value set in advance, in addition to the second correction process, when the low-frequency disturbance component is less than the high-frequency disturbance component.

5. The robot drive device according to claim 2, wherein:

the disturbance index is a position deviation of the joint or a torque deviation of the motor; and the second processor includes a filtering unit configured to divide the position deviation of the joint or the torque deviation of the motor into a high frequency side component and a low frequency side component.

6. A robot drive method for a robot drive device, the robot drive device including a motor drive circuit configured to increase and decrease a drive current according to a control instruction value and to output a position present value corresponding to a rotational angle of a motor, the drive current being provided to the motor attached to a joint of a robot, a first processor configured to generate the control instruction value using at least the position present value, a position target value for the joint of the robot, a virtual spring constant, a torque target value, and a speed target value, and a second processor configured to output a corrected position target value and a corrected virtual spring constant to the first processor in cycles synchronized with cyclic processes of the first processor, the corrected position target value and the corrected virtual spring constant being obtained by correcting the position target value and the virtual spring constant, respectively, the robot drive method comprising performing a correction process in which a position control method is applied to a low-frequency disturbance component with a low frequency, among disturbances provided to the motor, and in which a virtual spring constant control method is applied to a high-frequency disturbance component with a high frequency, by using the second processor, the position control method being a method in which the position target value is corrected, the virtual spring constant control method being a method in which the virtual spring constant is corrected.

7. A non-transitory storage medium storing instructions that are executable by one or more processors of a robot drive device and that cause the one or more processors to perform functions, the robot drive device including a motor drive circuit configured to increase and decrease a drive current according to a control instruction value, and to output a position present value corresponding to a rotational angle of a motor, the drive current being provided to the motor attached to a joint of a robot, a first processor configured to generate the control instruction value using at least the position present value, a position target value for the joint of the robot, a virtual spring constant, a torque target value, and a speed target value, a second processor configured to output a corrected position target value and a corrected virtual spring constant to the first processor in cycles synchronized with cyclic processes of the first processor, the corrected position target value and the corrected virtual spring constant being obtained by correcting the position target value and the virtual spring constant, respectively, and the one or more processors configured to perform a computation process of the second processor, the functions comprising performing a correction process in which a position control method is applied to a low-frequency disturbance component with a low frequency, among disturbances provided to the motor, and in which a virtual spring constant control method is applied to a high-frequency disturbance component with a high frequency, the position control method being a method in which the position target value is corrected, the virtual spring constant control method being a method in which the virtual spring constant is corrected.

* * * * *